United States Patent
Cha

(10) Patent No.: US 11,741,697 B2
(45) Date of Patent: Aug. 29, 2023

(54) METHOD FOR ANNOTATION BASED ON DEEP LEARNING

(71) Applicant: SI Analytics Co., Ltd, Daejeon (KR)

(72) Inventor: Keumgang Cha, Daejeon (KR)

(73) Assignee: SI Analytics Co., Ltd, Daejeon (KR)

( * ) Notice: Subject to any disclaimer, the term of this patent is extended or adjusted under 35 U.S.C. 154(b) by 0 days.

(21) Appl. No.: 17/818,745

(22) Filed: Aug. 10, 2022

(65) Prior Publication Data

US 2023/0094155 A1 Mar. 30, 2023

(30) Foreign Application Priority Data

Aug. 11, 2021 (KR) .......................... 10-2021-0105747

(51) Int. Cl.
*G06V 10/82* (2022.01)
*G06V 10/774* (2022.01)

(52) U.S. Cl.
CPC ............ *G06V 10/82* (2022.01); *G06V 10/774* (2022.01)

(58) Field of Classification Search
None
See application file for complete search history.

(56) References Cited

U.S. PATENT DOCUMENTS

| | | | |
|---|---|---|---|
| 10,699,192 B1 | 6/2020 | Kim et al. | |
| 10,762,393 B2 | 9/2020 | Kim et al. | |
| 11,030,489 B1 | 6/2021 | Kim et al. | |
| 11,048,979 B1 | 6/2021 | Zhdanov et al. | |
| 2016/0004904 A1* | 1/2016 | Senechai | G16H 20/30 382/118 |
| 2019/0332893 A1 | 10/2019 | Roy Chowdhury et al. | |
| 2020/0074302 A1* | 3/2020 | Goto | G06N 3/006 |
| 2020/0218888 A1 | 7/2020 | Gong et al. | |

FOREIGN PATENT DOCUMENTS

| | | |
|---|---|---|
| JP | 2020035095 A | 3/2020 |
| KR | 10-2020-0095386 A | 8/2020 |
| KR | 10-2280414 B1 | 7/2021 |

OTHER PUBLICATIONS

König, Jonas, et al. "Multi-stage reinforcement learning for object detection." Advances in Computer Vision: Proceedings of the 2019 Computer Vision Conference (CVC), vol. 1 1. Springer International Publishing, 2020. (Year: 2020).*

Yun, Sangdoo, et al. "Action-driven visual object tracking with deep reinforcement learning." IEEE transactions on neural networks and learning systems 29.6 (2018): 2239-2252. (Year: 2018).*

(Continued)

*Primary Examiner* — Sean M Conner
(74) *Attorney, Agent, or Firm* — Gottlieb, Rackman & Reisman, P.C.

(57) ABSTRACT

Disclosed is a method for annotation based on deep learning, which is performed by a computing device. The method may include: performing first learning of an agent model as supervised learning based on a first bounding box of an interest object corresponding to a ground truth (GT) for annotation; and performing second learning of the agent model as reinforcement learning based on a second bounding box of the interest object randomly sampled according to a constraint for geometric transform of a bounding box.

21 Claims, 8 Drawing Sheets

(56) References Cited

OTHER PUBLICATIONS

Peng, Xuan, et al. "Rist: A reinforcement learning approach to scene text detection refinement." 2020 25th International Conference on Pattern Recognition (ICPR). IEEE, 2021. (Year: 2021).*

Zhang, Dingwen, et al. "From discriminant to complete: Reinforcement searching-agent learning for weakly supervised object detection." IEEE transactions on neural networks and learning systems 31.12 (2020): 5549-5560. (Year: 2020).*

Ayle, Morgane, et al. "Bar—a reinforcement learning agent for bounding-box automated refinement." Proceedings of the AAAI Conference on Artificial Intelligence. vol. 34. No. 03. 2020. (Year: 2020).*

Yifan Jiang et al., "Precise Regression for Bounding Box Correction for Improved Tracking Based on Deep Reinforcement Learning", School of Electrical and Computer Engineering, Korea University, Seoul, Korea, ICASSP 2018.

Ksenia Konyushkova et al., "Learning Intelligent Dialogs for Bounding Box Annotation", Proceedings of the IEEE Conference on Computer Vision and Pattern Recognition (CVPR), 2018, pp. 9175-9184.

Juan C. Caicedo et al., "Active Object Localization with Deep Reinforcement Learning," arXiv:1511.06015v1 [cs CV] Nov. 18, 2015 (Nov. 18, 2015).

Dmitry Kangin et al., "Combination of Supervised and Reinforcement Learning For Vision-Based Autonomous Control," Under review as a conference paper at ICLR 2018 (Feb.16, 2018).

* cited by examiner (a)  (b)  (c)

METHOD FOR ANNOTATION BASED ON DEEP LEARNING

CROSS-REFERENCE TO RELATED APPLICATIONS

This application claims priority to and the benefit of Korean Patent Application No. 10-2021-0105747 filed in the Korean Intellectual Property Office on Aug. 11, 2021, the entire contents of which are incorporated herein by reference.

TECHNICAL FIELD

The present disclosure relates to an image processing method, and more particularly, to deep learning technology for complementing an annotation task performed by an annotator.

BACKGROUND ART

In a computer vision field, deep learning technologies for detecting the type of meaningful object which is present in an image or a video, and a position thereof are variously developed. In general, deep learning based object detection is performed by a scheme of finding a candidate area for an interest object which is present in the video, and predicting the type and the position of the object for the candidate area through a deep learning model.

For operation of the deep learning model for object detection, accurate learning of the deep learning model needs to be preceded. Learning data including accurate information on the type and the position of the interest object is required for learning of the deep learning model. As part of a task of processing the learning data to include the accurate information on the interest object, annotation for the interest object is performed.

The annotation is generally performed through a task of drawing a bounding box for the interest object which is present in the video directly by a person. However, since each person has a different view of the object, it is difficult that the bounding box has consistency for each object. Accordingly, when the annotation for the interest object which is present in the video is performed by multiple workers, there is a problem in that the learning data itself cannot guarantee the accuracy of the information on the interest object due to a difference of an annotation result. Further, when the annotation is performed by one worker, there is a problem in that considerable cost and time cannot but be required for the annotation task.

Japanese Patent Unexamined Publication No. 2020035095 (Mar. 5, 2020) discloses an apparatus and a method for annotation.

SUMMARY OF THE INVENTION

The present disclosure has been made in an effort to provide a method for complementing an annotation result performed by an annotator through a deep learning model.

An embodiment of the present disclosure provides a method for annotation based on deep learning, which is performed by a computing device. The method may include: performing first learning of an agent model based on a first bounding box of an interest object corresponding to a ground truth (GT) for annotation; and performing second learning of the agent model based on a second bounding box of the interest object randomly sampled according to a constraint for geometric transform of a bounding box.

In an alternative embodiment, the performing of the first learning of the agent model may include performing the geometric transform of the first bounding box based on actions selectable by the agent model, and training the agent model based on the first bounding box to which the geometric transform is applied.

In an alternative embodiment, the performing of the geometric transform for the first bounding box may include permuting the actions selectable by the agent model, and shuffling the permuted actions, and performing the geometric transform for the first bounding box by reflecting the shuffled actions.

In an alternative embodiment, the training of the agent model based on the first bounding box to which the geometric transform is applied may include training the agent model by using a reverse order of the shuffled actions as the ground truth (GT) of the action learned by the agent model based on the first bounding box to which the geometric transform is applied.

In an alternative embodiment, the performing of the second learning of the agent model may include training the agent model based on the second bounding box randomly sampled based on a first constraint, and training the agent model based on the second bounding box randomly sampled based on a second constraint. In this case, the second constraint may be determined based on the first constraint so that a difficulty of the learning based on the second constraint increases as compared with the learning based on the first constraint.

In an alternative embodiment, the training of the agent model based on the second bounding box randomly sampled based on the first constraint may include performing geometric transform for a second bounding box according to the first constraint based on the actions selectable by the agent model by using the agent model, and training the agent model based on a compensation applied according to an overlapping ratio between the second bounding box according to the first constraint to which the geometric transform is applied, and the first bounding box.

In an alternative embodiment, the training of the agent model based on the second bounding box randomly sampled based on the second constraint may include performing the geometric transform for the second bounding box according to the second constraint based on the actions selectable by the agent model by using the agent model when a completion condition of the learning based on the first constraint is satisfied, and training the agent model based on the compensation applied according to the overlapping ratio between the second bounding box according to the second constraint for which the geometric transform is performed, and the first bounding box.

In an alternative embodiment, the completion condition of the learning based on the first constraint may include a case of maintaining an accumulation value of the compensation calculated through the learning based on the first constraint to be a predetermined reference value or more.

In an alternative embodiment, the training of the agent model based on the compensation may include determining the compensation for the action selected by the agent model based on at least one of a size or an increase/decrease of the overlapping ratio between the second bounding box according to the second constraint for which the geometric transform is performed by the action selected by the agent model, and the first bounding box, and training the agent model based on the determined compensation for the action selected by the agent model.

In an alternative embodiment, the actions selectable by the agent model may include movement of the bounding box, width adjustment of the bonding box, height adjustment of the bounding box, and angle transform of the bounding box.

In an alternative embodiment, the constraint may be a condition of limiting the geometric transform of the second bounding box to be performed within a predetermined range determined based on the first bounding box.

Another embodiment of the present disclosure provides a method for annotation based on deep learning, which is performed by a computing device. The method may include: generating a bounding box for an interest object based on an input of an annotator; and performing geometric transform of the bounding box based on actions selectable by an agent model by using a pre-learned agent model.

In an alternative embodiment, the agent model may learn an action for geometric transform of a bounding box based on a first bounding box of an interest object corresponding to a ground truth (GT), and learn an action for the geometric transform of the bounding box based on a second bounding box of the interest object randomly sampled according to a constraint for the geometric transform of the bounding box.

Still another embodiment of the present disclosure provides a computer program stored in a computer-readable storage medium. The computer program executes the following operations for performing annotation based on deep learning when the computer program is executed by one or more processors and the operations may include: an operation of performing first learning of an agent model based on a first bounding box of an interest object corresponding to a ground truth (GT); and an operation of performing second learning of the agent model based on a second bounding box of the interest object randomly sampled according to a constraint for geometric transform of a bounding box.

Yet another embodiment of the present disclosure provides a computer program stored in a computer-readable storage medium. The computer program executes the following operations for performing annotation based on deep learning when the computer program is executed by one or more processors, and the operations may include: an operation of generating a bounding box for an interest object based on an input of an annotator; and an operation of performing geometric transform of the bounding box based on actions selectable by an agent model by using a pre-learned agent model.

Still yet another embodiment of the present disclosure provides a computing device performing annotation based on deep learning. The device includes: a processor including at least one core; a memory including program codes executable in the processor; and a network unit receiving an image for an interest object, and the processor may be configured to perform first learning of an agent model based on a first bounding box of an interest object corresponding to a ground truth (GT), and perform second learning of the agent model based on a second bounding box of the interest object randomly sampled according to a constraint for geometric transform of a bounding box.

A further another embodiment of the present disclosure provides a computing device performing annotation based on deep learning. The device includes: a processor including at least one core; a memory including program codes executable in the processor; and a network unit receiving an image for an interest object, and the processor may be configured to generate a bounding box for the interest object based on an input of an annotator, and perform geometric transform of the bounding box based on actions selectable by an agent model by using a pre-learned agent model.

According to an embodiment of the present disclosure, a method for complementing an annotation result performed by an annotator through a deep learning model can be provided.

Effects which can be obtained in the present disclosure are not limited to the aforementioned effects and other unmentioned effects will be clearly understood by those skilled in the art from the following description.

DETAILED DESCRIPTION

Figure 1:
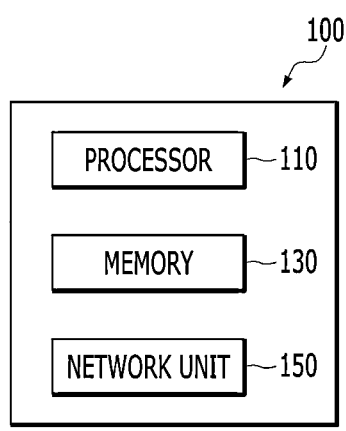
FIG. 1 is a block diagram of a computing device for performing annotation based on deep learning according to an embodiment of the present disclosure.

Hereinafter, various embodiments are described with reference to the drawings. In the present specification, various descriptions are presented for understanding the present disclosure. However, it is obvious that the embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function, an artificial neural network, and a neural network may be interchangeably used.

Meanwhile, the term "image" or "video" used throughout the detailed description and claims of the present disclosure refers to multi-dimensional data constituted by discrete image elements (e.g., pixels in a 2D image), and in other words, refers to an object which may be seen with an eye (e.g., displayed on a video screen) or a digital representation of the object (such as a file corresponding to a pixel output).

FIG. 1 is a block diagram of a computing device for performing annotation based on deep learning according to an embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an embodiment of the present disclosure. According to the embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the embodiment of the present disclosure, the training of the network function and the data classification by using a network function may be processed by using the processors of the plurality of computing devices together. Further, the computer program executed in the computing device according to the embodiment of the present disclosure may be a CPU, GPGPU, or TPU executable program.

According to an embodiment of the present disclosure, the processor 110 may train a deep learning based agent model performing annotation of a video expressing an interest object. In this case, the annotation of the video expressing the interest object may be appreciated as a task including generation, modification, transform, etc., of a bounding box including the interest object. The bounding box may be appreciated as any form of geometric structure (e.g., rectangular structure) capable of encompassing a specific form of object. For example, the processor 110 may largely train the deep learning based agent model performing geometric transform for the bounding box of the interest object at two stages. The processor 110 may perform supervised learning based first learning of the agent model based on a first bounding box of the interest object corresponding to a ground truth (GT) for the annotation. The first learning may be appreciated as precedent learning performed in order to increase performance of second learning to be described below. The processor 110 may generate a second bounding box by randomly sampling the first bounding box of the interest object according to a constraint of the geometric transform of the bounding box. In this case, the random sampling may be appreciated as randomly moving and arranging the first bounding box in the video considering a specific constraint. After performing the first learning, the processor 110 may perform reinforcement learning based second learning of the agent model based on the second bounding box of the interest object.

The processor 110 may perform an annotation task for the video by using the agent model pre-learned by the scheme. The processor 110 may perform a task of correcting the bounding box of the interest object generated in the video according to an input of an annotator by using the agent model. In this case, the annotator may be appreciated as a worker who perform the annotation in order to make learning data of a deep learning model for object detection. For example, the processor 110 may first generate the bounding box for the interest object which is present in the video based on the input of the annotator. Substantially, since a probability that the bounding box of the interest object generated based on the input of the annotator will be inaccurate is high, the processor 110 may correct the bounding box generated according to the input of the annotator by using the agent model learned at two stages as described above. In other words, the processor 110 may perform geometric transform of the bounding box according to actions selectable by the agent model by using the agent model learned at two stages. In this case, the actions selectable by the agent model as discrete actions for the geometric transform of the bounding box may include movement of the bounding box, width adjustment of the bonding box, height adjustment of the bounding box, and angle transform of the bounding box.

According to the embodiment of the present disclosure, the memory 130 may store a predetermined type of information generated or determined by the processor 110 and a predetermined type of information received by a network unit 150.

According to the embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to an embodiment of the present disclosure may use any type of known wired or wireless communication system.

The network unit 150 may receive an image in which an interest object is expressed from an external system. For example, the network unit 150 may receive a ground captured image including an object such as a transportation means from a satellite system, an aviation system, etc. The ground photographing image including an object such as a transportation means may be data for learning or inference of a neural network model. The ground photographing image in which the object of interest is expressed may include both an electro-optical image photographed through an artificial satellite, an aircraft, and a synthetic aperture radar (SAR) image. The ground photographing image on which the interest object is expressed is not limited to the above-described example, and may be variously configured within a range understood by those skilled in the art.

In addition, the network unit 150 may transmit and receive information, a user interface, etc. processed by the processor 110 through communication with other terminals. For example, the network unit 150 may provide a user interface generated by the processor 110 to the client (e.g., user terminal). Also, the network unit 150 may receive an external input of a user applied to the client and transmit the received input to the processor 110. In this case, the processor 110 may process operations such as output, correction, change, and addition of information provided through the user interface based on an external input of the user transmitted from the network unit 150.

Although not illustrated in FIG. 1, the computing device 100 may also include an input unit and an output unit.

The input unit according to an alternative embodiment of the present disclosure may include keys and/or buttons on the user interface or physical keys and/or buttons for receiving the user input. A computer program for controlling a display according to embodiments of the present disclosure may be executed according to the user input through the input unit.

The input unit receives a signal by sensing a button operation or a touch input of the user or receives speech or a motion of the user through a camera or a microphone to convert the received signal, speech, or motion into an input signal. To this end, speech recognition technologies or motion recognition technologies may be used.

The input unit may also be implemented as external input equipment connected to the computing device 100. For example, the input equipment may be at least one of a touch pad, a touch pen, a keyboard, or a mouse for receiving the user input, but this is just an example and the present disclosure is not limited thereto.

The input unit may recognize a user touch input. The input unit according to an embodiment of the present disclosure may be the same component as the output unit. The input unit may be configured as a touch screen implemented to receive selection input of the user. The touch screen may adopt any one scheme of a contact type capacitive scheme, an infrared light detection scheme, a surface ultrasonic wave (SAW) scheme, a piezoelectric scheme, and a resistance film scheme. A detailed description of the touch screen is just an example according to an embodiment of the present disclosure and various touch screen panels may be adopted in the computing device 100. The input unit configured as the touch screen may include a touch sensor. The touch sensor may be configured to convert a change in pressure applied to a specific portion of the input unit or capacitance generated at the specific portion of the input unit into an electrical input signal. The touch sensor may be configured to detect touch pressure as well as a touched position and area. When there is a touch input for the touch sensor, a signal(s) corresponding to the touch input is(are) sent to a touch controller. The touch controller processes the signal(s) and thereafter, transmits data corresponding thereto to the processor 110. As a result, the processor 110 may recognize which area of the input unit is touched, and the like.

According to an alternative embodiment of the present disclosure, the output unit may output any type of information generated or determined by the processor 110 or any type of information received by the user interface and the network unit 150.

For example, the output unit may include at least one of a liquid crystal display (LCD), a thin film transistor-liquid crystal display (TFT LCD), an organic light-emitting diode (OLED), a flexible display, and a 3D display. Some display modules among them may be configured as a transparent or light transmissive type to view the outside through the displays. This may be called a transparent display module and a representative example of the transparent display module includes a transparent OLED (TOLED), and the like.

Meanwhile, according to an embodiment of the present disclosure, the computing device 100 as a computing system that transmits and receives information to and from the client through communication may include a server. In this case, the client may be any type of terminal which may access the server. For example, the computing device 100 which is the server may receive a ground photographing image from an artificial satellite system and perform an annotation task for the object, and provide a user interface related to a task result to the user terminal. In this case, the user terminal may output the user interface received from the computing device 100 as the server, and receive and process the information through an interaction with the user.

In an additional embodiment, the computing device 100 may also include any type of terminal that performs additional information processing by receiving a data resource generated in any server.

Figure 2:
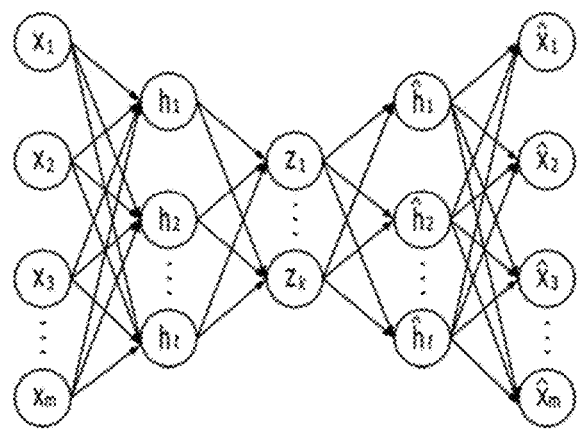
FIG. 2 is a schematic diagram illustrating a network function according to an embodiment of the present disclosure.

FIG. 2 is a schematic diagram illustrating a network function according to the embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
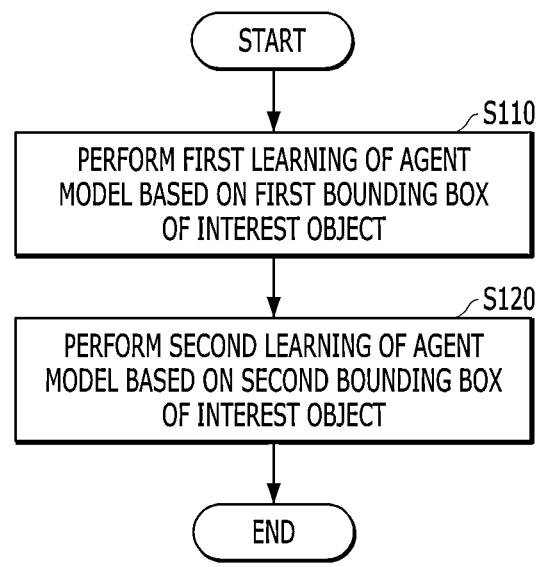
FIG. 3 is a flowchart of summarizing an entire learning process of an agent model for performing annotation of a computing device according to an embodiment of the present disclosure.
Figure 4:
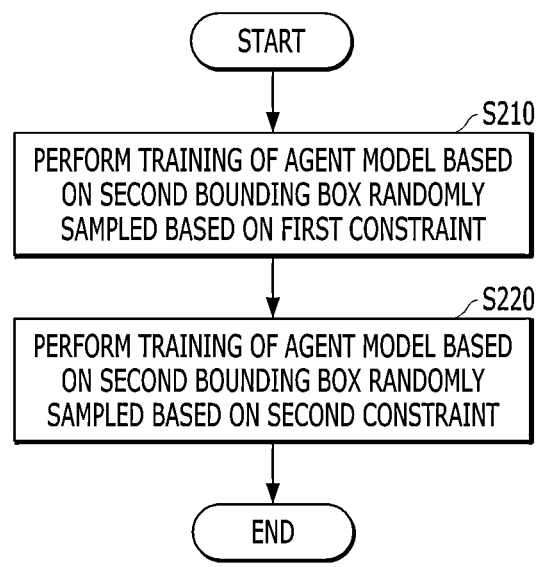
FIG. 4 is a flowchart of summarizing a reinforcement learning process of an agent model for performing annotation of a computing device according to an embodiment of the present disclosure.

FIG. 3 is a flowchart of summarizing an entire learning process of an agent model for performing annotation of a computing device according to an embodiment of the present disclosure and FIG. 4 is a flowchart of summarizing a reinforcement learning process of an agent model.

Referring to FIG. 3, in step S310, the computing device 100 according to an embodiment of the present disclosure may train the agent model based on supervised learning in order to reduce an action radius of the agent model in the second learning to be performed in step S320. The first learning of the agent model performed in step S310 may be performed based on noise for the actions which the agent model may select for correcting the bounding box. In this case, since the actions for the annotation of the agent model according to an embodiment of the present disclosure are discrete, the noise may be generated through random sampling for the discrete actions. Supervised learning based first learning utilizing the noise may assist enhancing the performance of the agent model as the reinforcement learning based second learning to be performed in step S320 is effectively performed.

In step S310, the computing device 100 may train the agent model based on the first bounding box of the interest object which is present in the video. In this case, the first bounding box may be a bounding box corresponding to the ground truth (GT) for the annotation of the interest object which is present in the video. The computing device 100 may perform the geometric transform for the first bounding box based on the actions selectable by the agent model. In this case, the actions selectable by the agent model may include movement of the bounding box, width adjustment of the bonding box, height adjustment of the bounding box, and angle transform of the bounding box. The computing device 100 may train the actions for the geometric transform of the bounding box of the agent model based on the first bounding box to which the geometric transform is applied.

For example, the computing device 100 may receive a ground image photographed through an artificial satellite from an external system or terminal as data for the first learning of the agent model. In this case, the ground image may include the first bounding box corresponding to the ground truth (GT) accurately annotated based on an interest object such as an aircraft. In other words, the computing device 100 may receive, from an artificial satellite system, the ground image including the ground truth (GT) of the bounding box for the supervised learning based first learning of the agent model and the interest object.

For the geometric transform of the first bounding box required for learning the agent model, the computing device 100 may permute the actions so as to prevent the actions selectable by the agent model from being repeatedly shown. In addition, the computing device 100 may shuffle the permuted actions. The computing device 100 may perform the geometric transform for the first bounding box according to the shuffled actions. The computing device 100 may train the agent model by using a reverse order of the shuffled actions as the ground truth (GT) of the action learned by the agent model based on the first bounding box to which the geometric transform is applied.

Specifically, when it is assumed that the actions selectable by the agent model are four actions: upper movement, lower movement, left movement, and right movement of the bounding box, the computing device 100 may align four actions in an order of [upper, lower, left, and right] so as to prevent some of four actions from being repeatedly shown. The computing device 100 may shuffle the actions permuted as [upper, lower, left and right] in any order such as [left, lower, right, and upper]. The computing device 100 may move the first bounding box in the order of [left, lower, right, and upper] according to the order of the shuffled actions. In order for the first bounding box to be restored to an original place corresponding to the ground truth (GT), the bounding box should move in the order of [upper, right, lower, and left] which is the reverse order of [left, lower, right, and upper]. Therefore, the computing device 100 may train the agent model by using the actions according to the order of [upper, right, lower, and left] which is the reverse order of the shuffled actions as the ground truth (GT). The concrete description described above is merely one example to help understand, and the present disclosure is not limited thereto.

Referring to FIG. 4, in step S320 the computing device 100 may train the agent model for which supervised learning is performed in step S310 based on reinforcement learning. In this case, in order to enhance learning adaptability in various environments, the computing device 100 may perform the reinforcement learning based second learning of the agent model by adjusting a learning difficulty based on a constraint for the bounding box of the interest object. In other words, the computing device 100 adjusts a geometric transform degree of the bounding box to perform the reinforcement learning of the agent model considering the difficulty at least once or more. It is possible to effectively enhance annotation accuracy and performance of the agent model through the second learning performed at a high difficulty by starting at a relatively low difficulty.

In step S320, the computing device 100 may train the agent model based on the second bounding box of the interest object which is present in the video. In this case, the second bounding box may be a box randomly sampled according to the constraint for the geometric transform of the bounding box. The constraint may be appreciated as a condition of limiting the geometric transform of the second bounding box to be performed within a specific range based on the first bounding box. The second learning based on the second bounding box may be largely performed at two stages. First, the computing device 100 may train the agent model based on the second bounding box randomly sampled based on a first constraint having a relatively low difficulty. When the learning according to the first constraint is completed, the computing device 100 may re-train the agent model based on the second bounding box randomly sampled based on a second constraint having a relatively high difficulty. In this case, the second constraint may be determined from the first constraint so as to perform learning having a relatively high difficulty.

For example, when the supervised learning based first learning in step S310 is completed, the computing device 100 may generate the second bounding box of the interest object based on the first constraint which becomes a reference of the random sampling for the geometric transform of the bounding box. The first constraint represents a condition of limiting a position, sizes of a width and a height, an angle, etc., of the interest object for the second learning in the video of the bounding box. That is, the computing device 100 may generate the second bounding box as data for the reinforcement learning of the agent model by randomly geometrically transforming the bounding box within the first constraint.

Specifically, the first constraint may include a condition that limits a center of the second bounding box moves within a range area between 25% and 75% based on the center of the first bounding box corresponding to the ground truth (GT). Further, the first constraint may include a condition that limits the width and the height of the second bounding box to be adjusted within a range between 50% to 150% based on the width and the height of the first bounding box. The computing device 100 may generate the second bounding box by randomly controlling the center, the width, and the height of the bounding box of the interest object within the first constraint of the above-described example. Numerical values related to the first constraint are just one example, and may be changed by a user so as for the agent model to easily perform the reinforcement learning in an environment having a comparatively low difficulty.

The computing device 100 may perform the geometric transform for the second bounding box randomly sampled based on the first constraint by using the agent model performing the first learning. In this case, the geometric transform of the second bounding box performed by the agent model may be appreciated as an operation of selecting one of the actions selectable by the agent model, and moving the position of the second bounding box according to the first constraint to be close to the ground truth (GT) or adjusting the width, the height, or the angle. In other words, the agent model may geometrically transform the second bounding box to be close to the first bounding box corresponding to the ground truth (GT) based on one of multiple actions. For example, when the second bounding box according to the first constraint is input, the agent model may move the second bounding box in the video by selecting a positional movement among the actions including the positional movement, width adjustment, height adjustment, and angle transform of the bounding box.

The computing device 100 may train the agent model based on a compensation applied according to an overlapping ratio between the geometrically transformed second bounding box and the first bounding box by the action selected by the agent model. The computing device 100 may determine the compensation for the action selected by the agent model based on at least one of a size or an increase/decrease of the overlapping ratio between two bounding boxes. Through repetition of an interaction in which the agent model selects the action for transforming the second bounding box, and the resulting compensation and updated information (e.g., the second bounding box transformed by the action) are provided to the agent model, the agent model may learn a policy of maximizing the compensation. In this case, the policy may be appreciated as a set regarding agent model a probability of conducting a specific action. In other words, the computing device 100 determines the compensation for the action of the agent model for the geometric transform of the second bounding box according to the first constraint, and provides the determined compensation to the agent model to perform the reinforcement learning for the agent model.

Specifically, the computing device 100 may determine the compensation based on intersection over union (IOU) between the second bounding box transformed by the action selected by the agent model, and the first bounding box. The computing device 100 may determine the compensation +1 when the IOU between the second bounding box transformed by the agent model, and the first bounding box increases, and −1 when the IOU decreases. When the compensation is determined based on the IOU between both bounding boxes by the computing device 100, the agent model may learn the actions for transforming the second bounding box based on the compensation and the second bounding box updated by the selected action. When the agent model selects the determination action, the computing device 100 may determine the compensation +3 when the IOU at the time of selecting the determination action is equal to or more than a threshold and −3 when the IOU is less than the threshold. In this case, the determination action may be appreciated as an action in which the agent model determines that the second bounding box according to the first constraint corresponds to the first bounding box and does not perform the geometric transform of the second bounding box. In other words, the computing device 100 may determine the compensation by determining whether the agent model normally selects the determination action based on the IOU between the bounding boxes. The numerical values related to the compensation are just one example for describing the reinforcement learning of the agent model, and may be changed in a range which may be appreciated by those skilled in the art.

Meanwhile, the computing device 100 may determine that the learning is completed based on the first constraint based on accumulated compensations. When an accumulation value of the compensation showing the increase/decrease change according to the action selected by the agent model maintains a predetermined reference value or more, the computing device 100 may regard that primary reinforcement learning of the agent model is completed and terminate learning according to the first constraint. Specifically, when the compensation is given as +1, −1, +3, or −3 according to the action selected by the agent model, the accumulation value of the compensation may increase or decrease over time. In this case, when it is determined that the accumulation value of the compensation increases and is equal to or more than a predetermined reference value (e.g., 20), the computing device 100 may determine that agent model the action for the geometric transform of the second bounding box according to the first constraint is sufficiently learned, and terminate the reinforcement learning based on the first constraint.

When the first learning according to the first constraint is completed, the computing device 100 may generate the second bounding box of the interest object based on the second constraint which becomes a reference of the random sampling for the geometric transform of the bounding box. The second constraint represents a condition of limiting a position, sizes of a width and a height, an angle, etc., of the interest object for the second learning in the video of the bounding box. The second constraint may be a condition in which a limitation range is alleviated compared with the first constraint. This is to enable the second learning according to the second constraint may be performed with a higher difficulty than the first learning according to the first constraint. In this case, the second constraint may also be automatically changed and determined by the computing device 100 from the first constraint based on the learning result according to the first constraint, and also predetermined jointly with the first constraint. The computing device 100 may generate the second bounding box as data for the reinforcement learning of the agent model by randomly geometrically transforming the bounding box within the second constraint.

Specifically, the second constraint may include a condition that limits a center of the second bounding box moves within a range area between 50% and 100% based on the center of the first bounding box corresponding to the ground truth (GT). Further, the second constraint may include a condition that limits the width and the height of the second bounding box to be adjusted within a range between 25% and 175% based on the width and the height of the first bounding box. That is, the second constraint may include conditions for enabling the bounding box to be randomly sampled in a wider range than the first constraint. The computing device 100 may generate the second bounding box by randomly controlling the center, the width, and the height of the bounding box of the interest object within the second constraint of the above-described example. Numerical values related to the second constraint are just one example, and may be changed by a user so as for the agent model to easily perform the reinforcement learning in an environment having a comparatively low difficulty.

The second learning based on the second bounding box randomly sampled based on the second constraint may be appreciated as a process corresponding to the first learning based on the first constraint. Therefore, contents regarding action selection, compensation determination, and learning termination of the second reinforcement learning duplicated with the first reinforcement learning will be omitted.

The computing device 100 may generate an agent model robust even to various environmental changes through the supervised learning based first learning using noise and reinforcement learning based second learning performed separately as first learning and second learning according to the difficulty.

Figure 5:
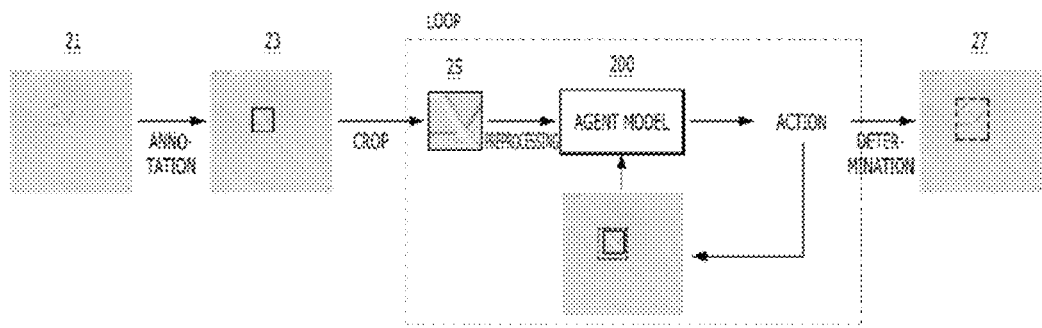
FIG. 5 is a block diagram illustrating an annotation performing process of a computing device according to an embodiment of the present disclosure.

FIG. 5 is a block diagram illustrating an annotation performing process of a computing device according to an embodiment of the present disclosure.

Referring to FIG. 5, the computing device 100 according to an embodiment of the present disclosure may receive an input signal of annotation for a satellite image 21 in which the aircraft is photographed as the interest object. In this case, the annotator may be appreciated as a worker who performs the annotation. The annotator may generate the annotation input signal for the interest object by using the user terminal, and transfer the generated input signal to the computing device 100. The computing device 100 may receive the input signal of the annotator from the terminal and generate a predetermined bounding box for the aircraft according to the input signal of the annotator. For example, when the annotator clicks a center of the aircraft which is present in the satellite image 21 through the user terminal, the annotation input signal corresponding to a click may be transferred from the user terminal to the computing device 100. The computing device 100 may generate a predetermined size-shaped bounding box for the aircraft based on the annotation input signal corresponding to the click.

Meanwhile, when the computing device 100 includes a separate input unit such as a touch display, etc., the annotator may also directly input the annotation input signal for the interest object into the computing device without using a separate terminal. Further, the computing device 100 may also directly receive the satellite image 23 in which the bounding box for the aircraft is generated from the external system.

The computing device 100 extracts a bounding box area from the satellite image 23 in which the bounding box for the aircraft is generated to generate a separate crop image 25. The computing device 100 may use the crop image 25 as input data of a pre-learned agent model 200. When there are crop images 25 of various time points, the computing device 100 may combine at least some of the crop images 25 of various time points through preprocessing and use the crop images as the input data of the agent model 200. For example, when crop images 25 before an n time point are combined, a computation for the combination of the crop image 25 may be expressed as in [Equation 1] below.

$$x_i = \text{concat}(x_{(t-m)}, x_{(t-n+1)}, \ldots, x_t) \qquad \text{[Equation 1]}$$

The agent model 200 receives crop images 25 at a specific time point to select the actions for the geometric transform of the bounding box for the aircraft. In this case, the actions which may be selected by the agent model 200 may be discrete. For example, the actions which may be selected by the agent model 200 may be summarized as in [Table 1] below.

TABLE 1

1. Moving center of bounding box to left side by specific pixels
2. Moving center of bounding box to right side by specific pixels
3. Moving center of bounding box to upper end by specific pixels
4. Moving center of bounding box to lower end by specific pixels
5. Reducing width of bounding box by specific pixels
6. Extending width of bounding box by specific pixels
7. Reducing height of bounding box by specific pixels
8. Reducing height of bounding box by specific pixels
9. Rotating angle of bounding box at α degrees in clockwise direction (α is a natural number)
10. Rotating angle of bounding box at α degrees in counterclockwise direction
11. Determining In the case of a normal image photographed through a ground camera, since objects are aligned based on a bottom surface, the rotation of the bounding box need not be considered as the operation for the geometric transform of the bounding box. However, in the case of an image photographed as an aviation view including the satellite image, a direction in which the objects are arranged should be considered, so the rotation of the bounding box such as operation #9 or #10 of [Table 1] should be considered as the operation for the geometric transform of the bounding box. The agent model 200 may modify the bounding box by repeating a process of selecting one of the operations movement, width or height adjustment, angle rotation, etc., of the bounding box before selecting a final determination action of the bounding box. When it is determined that the bounding box is accurately arranged in the aircraft, the agent model 200 selects a determination action corresponding to #11 of [Table 1] to terminate an inference loop. When the inference loop is terminated, the computing device 100 may generate a satellite image 27 including a final bounding box corrected by the agent model 200.

Figure 6:
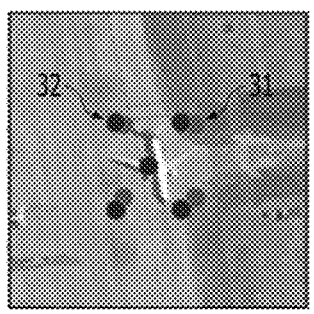
FIG. 6 is a conceptual view illustrating an annotation performing result of a computing device according to an embodiment of the present disclosure.
Figure 6:
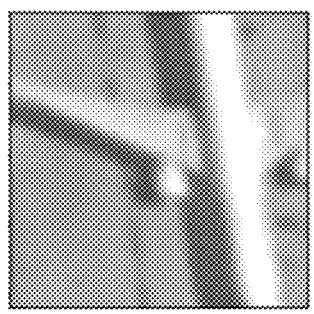
Figure 6:
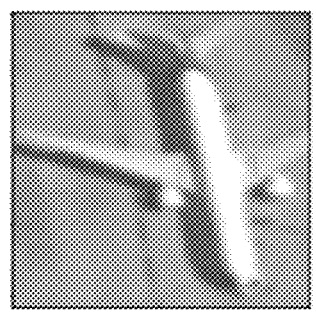

FIG. 6 is a conceptual view illustrating an annotation performing result of a computing device according to an embodiment of the present disclosure.

FIG. 6a illustrates a satellite image in which a bounding box generated through an input of the annotator and the bounding box modified through the agent model according to the present disclosure are displayed. A first point 31 indicates a vertex of the bounding box generated by the input of the annotator. A second point 32 indicates a vertex of the bounding box transformed by the pre-learned agent model. When the annotator generates the bounding box for the interest object through the input for the annotation, the agent model may correct the bounding box so that information of the interest object is accurately included according to a utilization purpose by performing the geometric transform of the bounding box generated through the input of the annotator.

FIG. 6b illustrates an image acquired by cropping the bounding box generated by the annotator and FIG. 6c illustrates an image acquired by cropping the bounding box modified by the agent model. In FIG. 6b, a wing of the aircraft and a part of a body which are interest objects are included while being cut, while in FIG. 6c, it may be identified that the wing and most of the body of the aircraft which are the interest objects are included. That is, by comparing FIGS. 6b and 6c, it may be seen that a bounding box of the interest object which is inaccurately generated by the annotator is corrected through the agent model, a problem of an existing annotation scheme which may not guarantee accuracy may be solved.

Figure 7:
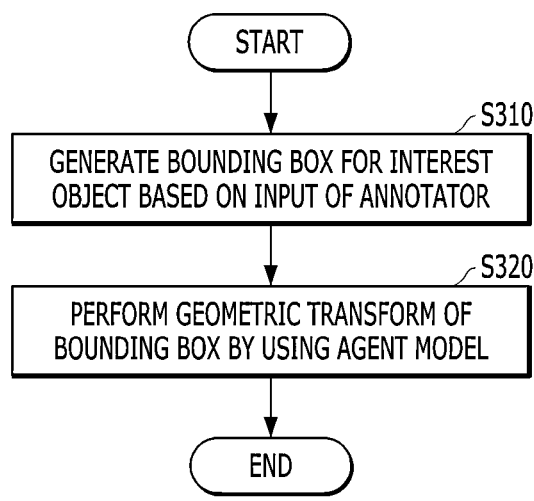
FIG. 7 is a flowchart for a method for annotation based on deep learning according to an embodiment of the present disclosure.

FIG. 7 is a flowchart for a method for annotation based on deep learning according to an embodiment of the present disclosure.

Referring to FIG. 7, in step S310, a computing device 100 according to an embodiment of the present disclosure may generate a bounding box for an interest object in an image based on an input of an annotator transferred from a user terminal. In this case, the input of the annotator may be appreciated as an initiation signal for an operation for generating the bounding box including the interest object. The computing device 100 may also generate the bounding box for the interest object by directly receiving the input of the annotator through a separate input unit. Further, the computing device 100 may also directly receive the image itself in which the bounding box is already generated from the external system without directly generating the bounding box.

In step S320, the computing device 100 may modify the bounding box of the interest object through geometric transform for the bounding box generated in step S310 by using the agent model. In this case, the agent model may pre-learn an action for the geometric transform of the bounding box based on the bounding box of the interest object corresponding to the ground truth (GT) in order to modify the bounding box. Further, the agent model may learn action the geometric transform of the bounding box based on a bounding box randomly sampled according to a constraint for the geometric transform of the bounding box. Such two-stage learning may be sequentially performed.

The computing device 100 may generate a user interface based on an image including a bounding box finally modified through the agent model 200. The computing device 100 may provide the user interface generated based o the final bounding box to the user terminal. When the computing device 100 includes a separate output unit such as a display, the computing device 100 may also directly provide the image in which the bounding box is finally modified to a user through the output unit without transferring the user interface to a separate terminal.

Figure 8:
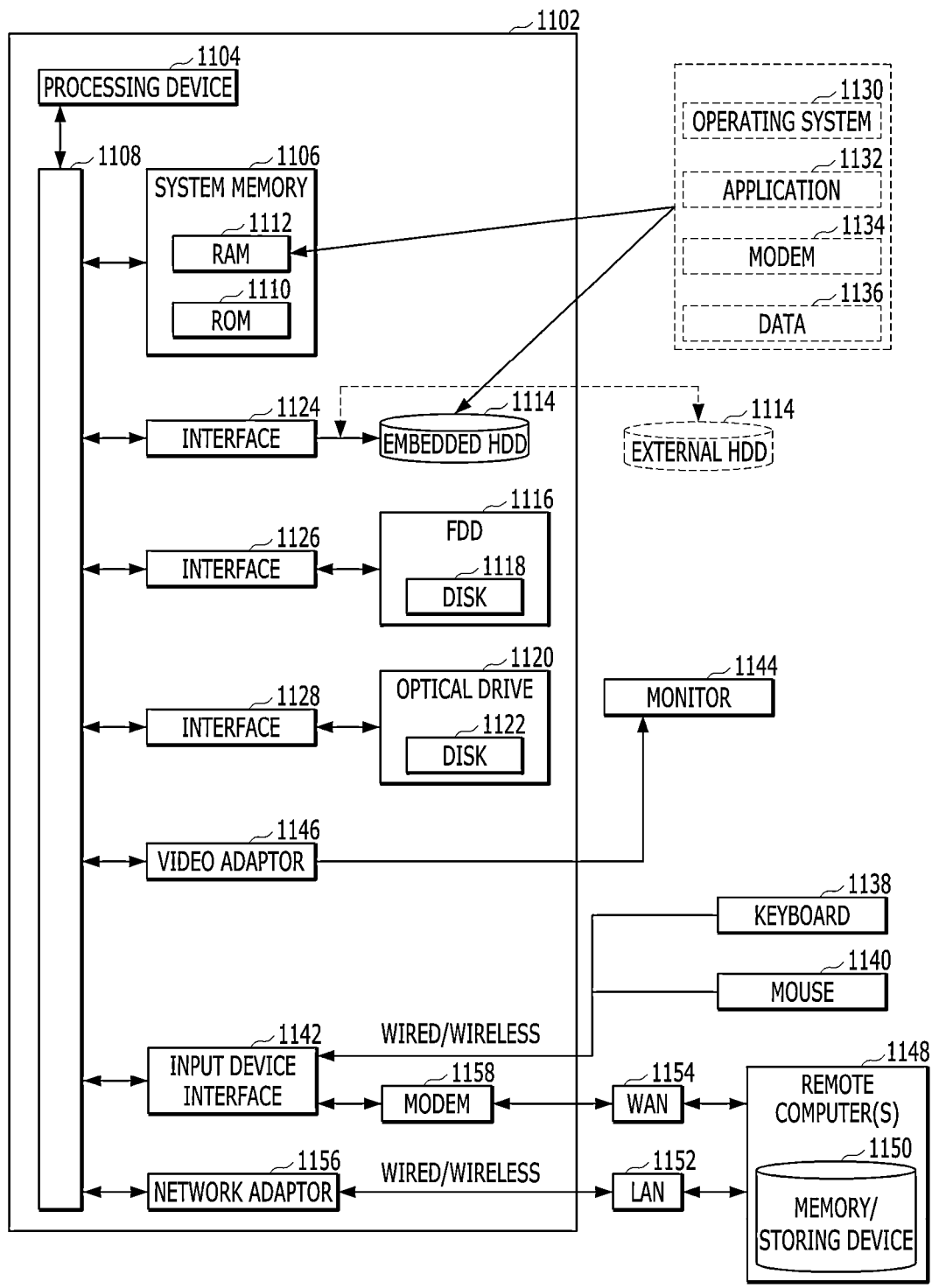
FIG. 8 is a schematic view of a computing environment according to an embodiment of the present disclosure.

FIG. 8 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

According to the embodiment of the present disclosure, a computer readable medium storing a data structure is disclosed.

The data structure may mean organization, management, and storage of data that enables efficient access and correction of the data. The data structure may mean organization of the data for solving a specific problem (for example, data search, data storage, and data correction in the shortest time). The data structure may also be defined as a physical or logical relation between data elements designed so as to support a specific data processing function. The logical relation between the data elements may include a connection relation between the data elements considered by the user. The physical relation between the data elements may include an actual relation between the data elements physically stored in the computer readable storage medium (for example, a hard disk). The data structure may particularly include a set of data, a relation between data, and a function or a command applicable to data. The computing device may perform the computation by minimally using the resources of the computing device through the effectively designed data structure. Particularly, the computing device may improve efficiency of computation, reading, insertion, deletion, comparison, exchange, and search through the effectively designed data structure.

The data structure may be divided into a linear data structure and a nonlinear data structure according to the form of the data structure. The linear data structure may be a structure in which only one data is connected after one data. The linear data structure may include a list, a stack, a queue, and a deque. The list may mean a series of data sets that are internally ordered. The list may include a linked list. The linked list may be a data structure in which each data is connected in a line with a pointer. The pointer in the linked list may include link information with next or previous data. The linked list may be expressed as a single linked list, a dual-linked list, a circular linked list according to the form. The stack may be a data listing structure limitedly accessible to data. The stack may be a linear data structure that may process (for example, insert or delete) data only at one end of the data structure. The data stored in the stack may be a data structure (Last in First Out (LIFO)), in which the later the data is stored, the faster the data comes out. The queue is a data listing structure limitedly accessible to data, and may be a data structure (First in First Out (FIFO)), in which the later the data is stored, the later the data comes out, unlike the stack. The deque may be a data structure that may process data at both ends of the data structure.

The nonlinear data structure may be the structure in which the plurality of data is connected after one data. The nonlinear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

The data structure may include a neural network. The data structure including the neural network may be stored in a computer readable medium. The data structure including the neural network may also include data input to the neural network, a weight of the neural network, a hyper parameter of the neural network, data obtained from the neural network, an active function associated with each node or layer of the neural network, and a loss function for training the neural network. The data structure including the neural network may include predetermined constituent elements among the disclosed configurations. That is, the data structure including the neural network may be formed of the entirety or a predetermined combination of data input to the neural network, a weight of the neural network, a hyper parameter of the neural network, data obtained from the neural network, an active function associated with each node or layer of the neural network, a loss function for training the neural network, and the like. In addition to the foregoing configurations, the data structure including the neural network may include other predetermined information determining a characteristic of the neural network. Further, the data structure may include any type of data used or generated in the computation process of the neural network, and is not limited to the foregoing matters. The computer readable medium may include a computer readable recording medium and/or a computer readable transmission medium. The neural network may be formed of a set of mutually connected calculation units which may be generally referred to as nodes. The nodes may also be referred to as neurons. The neural network includes one or more nodes.

The data structure may include data input to the neural network. The data structure including the data input to the neural network may be stored in the computer readable medium. The data input to the neural network may include training data input in the neural network training process and/or input data input to the neural network which is completely trained. The data input to the neural network may include preprocessed data and/or data to be preprocessed. The preprocessing may include a data processing process for inputting data to the neural network. Accordingly, the data structure may include the data to be processed and the data generated by the preprocessing. The foregoing data structure is merely an example, and the present disclosure is not limited thereto.

The data structure may include a weight of the neural network (in the present specification, the weight and the parameter may be used as the same meaning). Further, the data structure including the weight of the neural network may be stored in the compute readable medium. The neural network may include a plurality of weights. The weight may be variable, and in order for the neural network to perform a desired function, the weighted may be varied by a user or an algorithm. For example, when one or more input nodes are connected to one output node by links, respectively, the output node may determine an output node value based on the values input to the input nodes connected with the output node and a parameter set in the link corresponding to each of the input nodes. The foregoing data structure is merely an example, and the present disclosure is not limited thereto.

As a non-limited example, the weight may include a weight varied in a neural network training process and/or a weight when the neural network is completely trained. The weight varied in the neural network training process may include a weight at the start time of a training cycle and/or a weight varied during the training cycle. The weight when the neural network is completely trained may include a weight when the training cycle is completed. Accordingly, the data structure including the weight of the neural network may include a data structure including a weight varied in the neural network training process and/or a weight when the neural network is completely trained. Accordingly, it is determined that the weight and/or a combination of the respective weights are included in the data structure including the weight of the neural network. The foregoing data structure is merely an example, and the present disclosure is not limited thereto.

The data structure including the weight of the neural network may be stored in a computer readable storage medium (for example, a memory and a hard disk) after being subjected to a serialization process. The serialization may be the process of storing the data structure in the same or different computing device and converting the data structure into a form that may be reconstructed and used later. The computing device may serialize the data structure and transceive data through a network. The serialized data structure including the weight of the neural network may be reconstructed in the same computing device or the different computing device through deserialization. The data structure including the weight of the neural network is not limited to the serialization. Further, the data structure including the weight of the neural network may include a data structure (for example, B-Tree, Trie, m-way search tree, AVL tree, and Red-Black Tree in the nonlinear data structure) for improving efficiency of the computation while minimally using the resources of the computing device. The foregoing matter is merely an example, and the present disclosure is not limited thereto.

The data structure may include a hyper-parameter of the neural network. Further, the data structure including the hyper-parameter of the neural network may be stored in the computer readable medium. The hyper-parameter may be a variable varied by a user. The hyper-parameter may include, for example, a learning rate, a cost function, the number of times of the repetition of the training cycle, weight initialization (for example, setting of a range of a weight that is the target of the weight initialization), and the number of hidden units (for example, the number of hidden layers and the number of nodes of the hidden layer). The foregoing data structure is merely an example, and the present disclosure is not limited thereto.

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Accordingly, the present disclosure is not limited to the embodiments suggested herein, and shall be interpreted within the broadest meaning range consistent to the principles and new characteristics suggested herein.

What is claimed is:

1. A method for annotation based on deep learning, which is performed by a computing device including at least one processor, the method comprising:
    performing a first learning of an agent model as supervised learning based on a first bounding box of an interest object corresponding to a ground truth (GT) for annotation; and
    performing a second learning of the agent model as reinforcement learning based on a second bounding box of the interest object randomly sampled according to a constraint for geometric transform of a bounding box;
    wherein the step of performing of the second learning of the agent model comprises the steps of:
    training the agent model based on the second bounding box randomly sampled based on a first constraint, and
    training the agent model based on the second bounding box randomly sampled based on a second constraint, and
    wherein a limitation range of the second constraint is alleviated compared with a limitation range of the first constraint so that the second constraint includes conditions for enabling the second bounding box to be randomly sampled in a wider range than the first constraint.

2. The method of claim 1, wherein the step of performing the first learning of the agent model comprises:
    performing the geometric transform of the first bounding box based on actions selectable by the agent model, and
    training the agent model based on the first bounding box to which the geometric transform is applied.

3. The method of claim 2, wherein the step of performing of the geometric transform for the first bounding box comprises:
    permuting the actions selectable by the agent model;
    shuffling the permuted actions; and
    performing the geometric transform for the first bounding box by reflecting the shuffled actions.

4. The method of claim 3, wherein the training of the agent model based on the first bounding box to which the geometric transform is applied comprises training the agent model by using a reverse order of the shuffled actions as the ground truth (GT) of the action learned by the agent model based on the first bounding box to which the geometric transform is applied.

5. The method of claim 1, wherein the step of training of the agent model based on the second bounding box randomly sampled based on the first constraint comprises:
    performing geometric transform for a second bounding box according to the first constraint based on the actions selectable by the agent model by using the agent model; and
    training the agent model based on a compensation applied according to an overlapping ratio between the second bounding box according to the first constraint to which the geometric transform is applied, and the first bounding box.

6. The method of claim 5, wherein the step of training of the agent model based on the compensation comprises:
    determining the compensation for the action selected by the agent model based on at least one of a size or an increase/decrease of the overlapping ratio between the second bounding box according to the first constraint for which the geometric transform is performed by the action selected by the agent model, and the first bounding box; and
    training the agent model based on the determined compensation for the action selected by the agent model.

7. The method of claim 1, wherein the step of training of the agent model based on the second bounding box randomly sampled based on the second constraint comprises:
    performing the geometric transform for the second bounding box according to the second constraint based on the actions selectable by the agent model by using the agent model when a completion condition of the learning based on the first constraint is satisfied; and
    training the agent model based on the compensation applied according to the overlapping ratio between the second bounding box according to the second constraint for which the geometric transform is performed, and the first bounding box.

8. The method of claim 7, wherein the completion condition of the learning based on the first constraint comprises a case of maintaining an accumulation value of the compensation calculated through the learning based on the first constraint to be greater than or equal to a predetermined reference value.

9. The method of claim 7, wherein the training of the agent model based on the compensation comprises:
    determining the compensation for the action selected by the agent model based on at least one of a size or an increase/decrease of the overlapping ratio between the second bounding box according to the second constraint for which the geometric transform is performed by the action selected by the agent model, and the first bounding box; and
    training the agent model based on the determined compensation for the action selected by the agent model.

10. The method of claim 2, wherein the actions selectable by the agent model comprise movement of the bounding box, width adjustment of the bonding box, height adjustment of the bounding box, and angle transform of the bounding box.

11. The method of claim 1, wherein the constraint is a condition limiting the geometric transform of the second bounding box to be performed within a predetermined range determined based on the first bounding box.

12. The method of claim 1, wherein after the steps of performing the first learning and performing the second learning the agent model is available as a pre-learned agent model, the method further comprising:
generating a third bounding box for an interest object based on an input of an annotator; and
performing geometric transform of the third bounding box based on actions selectable by the pre-learned agent model.

13. The method of claim 5, wherein the actions selectable by the agent model comprise movement of the bounding box, width adjustment of the bonding box, height adjustment of the bounding box, and angle transform of the bounding box.

14. The method of claim 7, wherein the actions selectable by the agent model comprise movement of the bounding box, width adjustment of the bonding box, height adjustment of the bounding box, and angle transform of the bounding box.

15. The method of claim 1, wherein the step of training the agent model based on the second bounding box randomly sampled based on the second constraint is a retraining of the agent model performed after completion of the step of training the agent model based on the second bounding box randomly sampled based on the first constraint.

16. A computer program for performing annotation based on deep learning, the computer program stored in a non-transitory computer-readable storage medium, wherein the computer program when executed by one or more processors of a computer causes the computer to perform operations comprising:
an operation of performing a first learning of an agent model as supervised learning based on a first bounding box of an interest object corresponding to a ground truth (GT); and
an operation of performing a second learning of the agent model as reinforcement learning based on a second bounding box of the interest object randomly sampled according to a constraint for geometric transform of a bounding box,
wherein the operation of performing the second learning of the agent model comprises:
an operation of training the agent model based on the second bounding box randomly sampled based on a first constraint, and
an operation of training the agent model based on the second bounding box randomly sampled based on a second constraint, and
wherein a limitation range of the second constraint is alleviated compared with a limitation range of the first constraint so that the second constraint includes conditions for enabling the second bounding box to be randomly sampled in a wider range than the first constraint.

17. The computer program of claim 16, the operations of performing the first learning of the agent model and the second learning of the agent model producing a pre-learned agent model, the operations further comprising:
an operation of generating a third bounding box for an interest object based on an input of an annotator; and
an operation of performing geometric transform of the third bounding box based on actions selectable by the pre-learned agent model.

18. The computer program of claim 16, wherein the operation of training the agent model based on the second bounding box randomly sampled based on the second constraint is a retraining of the agent model resulting from the operation of training the agent model based on the second bounding box randomly sampled based on the first constraint.

19. A computing device performing annotation based on deep learning, comprising:
a processor including at least one core;
a memory including computer program codes executable by the processor; and
a network unit receiving an image for an interest object;
wherein the processor is configured by the computer program codes to:
perform a first learning of an agent model as supervised learning based on a first bounding box of an interest object corresponding to a ground truth (GT); and
perform a second learning of the agent model as reinforcement learning based on a second bounding box of the interest object randomly sampled according to a constraint for geometric transform of a bounding box;
wherein the processor is configured by the computer program codes to perform the second learning of the agent model by:
performing the training of the agent model based on the second bounding box randomly sampled based on a first constraint, and
performing the training of the agent model based on the second bounding box randomly sampled based on a second constraint, and
wherein a limitation range of the second constraint is alleviated compared with a limitation range of the first constraint so that the second constraint includes conditions for enabling the second bounding box to be randomly sampled in a wider range than the first constraint.

20. The computing device of claim 19, the result of first learning of the agent model and the second learning of the agent model comprising a pre-learned agent model, wherein the processor is further configured by the computer program codes to:
generate a third bounding box for the interest object based on an input of an annotator, and
perform geometric transform of the bounding box based on actions selectable by the pre-learned agent model.

21. The computing device of claim 19, wherein the processor is configured by the computer program codes to perform the training of the agent model based on the second bounding box randomly sampled based on the second constraint as a retraining of the agent model after performing the training of the agent model based on the second bounding box randomly sampled based on the first constraint.

* * * * *